Figure 1:
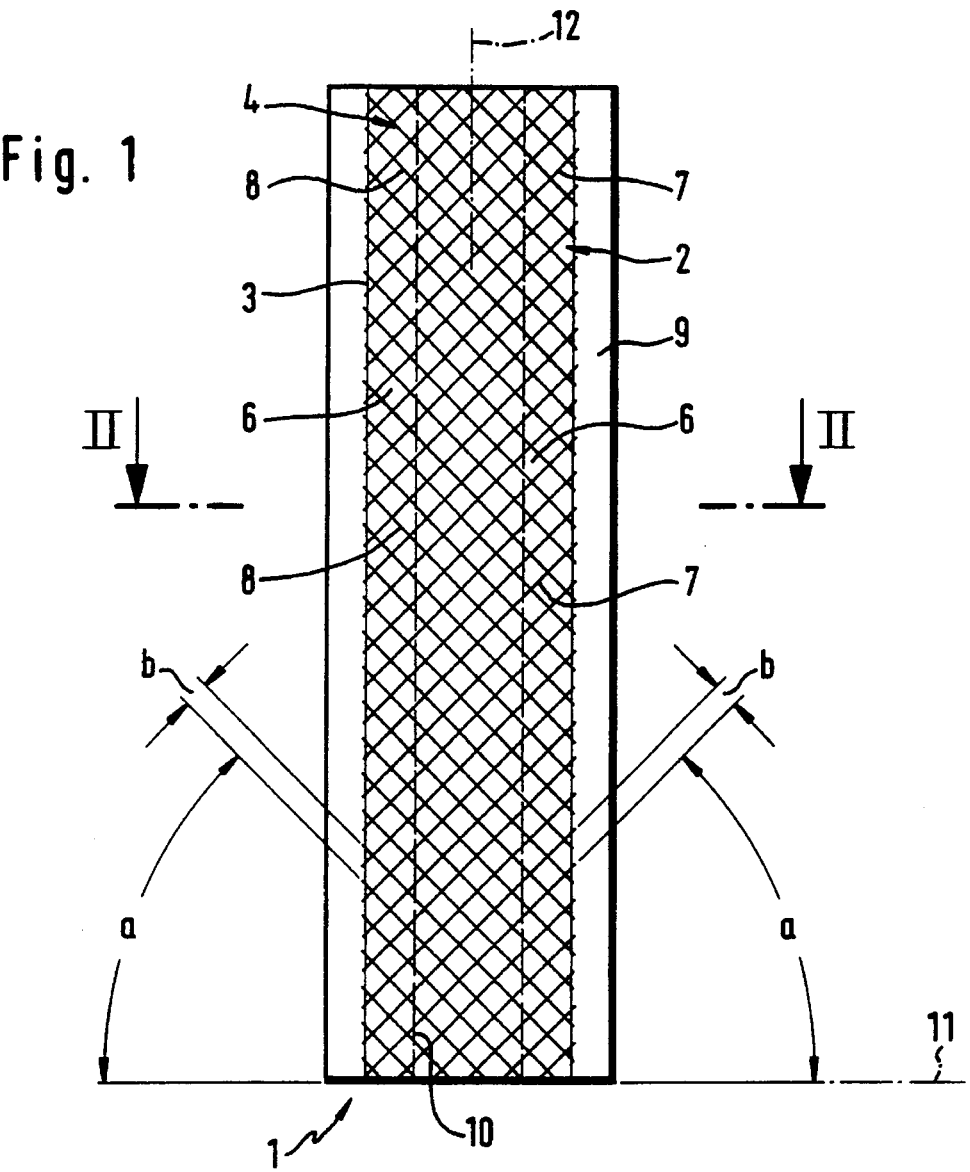

United States Patent [19]
Klawuhn et al.

[11] Patent Number: 5,613,523
[45] Date of Patent: Mar. 25, 1997

[54] HOT WATER RESISTANT PRESSURE HOSE

[75] Inventors: Manfred Klawuhn, Frankfurt am Main; Ulrich Haubruch, Witten; Ralf Skoda, Dortmund, all of Germany

[73] Assignee: Braun Aktiengesellschaft, Kronberg, Germany

[21] Appl. No.: 516,612

[22] Filed: Aug. 18, 1995

[30] Foreign Application Priority Data

Sep. 12, 1994 [DE] Germany .......................... 44 32 385.9

[51] Int. Cl.⁶ .................................................. F16L 11/08
[52] U.S. Cl. ........................... 138/126; 138/141; 138/153
[58] Field of Search ...................................... 138/125, 126, 138/123, 153, 141

[56] References Cited

U.S. PATENT DOCUMENTS

| | | | |
|---|---|---|---|
| 2,515,929 | 7/1950 | Ofeldt | 138/126 |
| 3,578,028 | 5/1971 | Roberts | 138/123 |
| 3,682,202 | 8/1972 | Bahrmann et al. | 138/126 |
| 3,826,286 | 7/1974 | Beck | 138/114 |
| 4,111,237 | 9/1978 | Mutzner et al. | 138/126 |
| 4,159,027 | 6/1979 | Caillet | 138/123 |
| 4,553,568 | 11/1985 | Piccoli et al. | 138/125 |
| 4,679,599 | 7/1987 | Newberry et al. | 138/126 |
| 4,734,305 | 3/1988 | Sugimoto et al. | 138/126 |
| 4,759,388 | 7/1988 | Kiyama et al. | 138/126 |
| 5,215,450 | 6/1993 | Tamari | 138/119 |

*Primary Examiner*—David Scherbel
*Assistant Examiner*—James F. Hook
*Attorney, Agent, or Firm*—Fish & Richardson, P.C.

[57] ABSTRACT

The invention is directed to a hot water resistant pressure hose (1) comprised of an inner tubing (2) made of an elastomer safe for use with food, preferably silicone, whose outer surface (3) has wound around it a plurality of multifilament polyester yarns (7, 8) forming a braid structure (4). This results in a braiding (4) having meshes (6) for establishing a positive-engagement bond between the inner tubing (2) and an outer tubing (9) made of an elastomer, preferably silicone, that is applied to the braiding (4). The outside diameter D of the inner tubing (2) is smaller than or equal to 6 mm, preferably 4.7 mm. For each winding direction, 10 to 15, preferably 12 polyester yarns (7, 8) are used, with the polyester yarns (7, 8) having a diameter that results at a weight of 250 den, minimum, and 310 den, maximum, preferably 280 den. Further, each mesh (6) is to cover an area of between 0.25 mm² and 2.25 mm², preferably 1 mm². A pressure hose (1) is obtained which is hot water resistant (95° C.), pressure resistant up to about 35 bar, inodorous, tasteless, and recyclable.

11 Claims, 1 Drawing Sheet

HOT WATER RESISTANT PRESSURE HOSE

This invention relates to a hot water resistant pressure hose, with an inner tubing made of an elastomer safe for use with food, whose outer surface has wound around it a plurality of multifilament yarns forming a braiding, such as to provide the braiding with meshes of approximately equal size through which a positive-engagement bond is established between the inner tubing and an elastomer outer tubing applied to the inner tubing, that is, to the braiding.

Pressure hoses are commercially available which are comprised of an inner tubing and an outer tubing formed of an elastomer, preferably silicone, in which following manufacture of the inner tubing its circumferential outer surface is covered with a multifilament glass thread wound thereon at an angle of interlacement of 45 degrees. In this pressure hose, 12 threads are compound-wound around the inner tubing in the right-hand direction, and 12 threads in the left-hand direction. Using such commercially available pressure hoses in espresso makers in which the fluid delivered is hot water at a temperature of about 95° C. and an operating pressure of 35 bar, maximum, it will be noted that this pressure hose is unable to withstand such loads. Also other food-safe pressure hoses of commerce which are not too large in diameter have failed to withstand such loads.

It is therefore an object of the present invention to devise a pressure hose which is hot water resistant, which, at an operating pressure of about 35 bar, has a high fatigue strength under alternating bending stresses and a high elasticity of pressure, and which is safe for use with food.

According to the present invention, the outside diameter of the inner tubing, the specified mesh and the thickness of the polyester yarn result in a hot water resistant pressure hose satisfying all demands for application in an espresso maker finding utility both at home and in the catering trade. By virtue of the pressure hose of the present invention with its specified meshes between the individual multifilament yarns, a firm bond of the outer tubing to the inner tubing is accomplished without involving the risk of the woven fabric becoming displaced or working loose in operation. The mesh areas are of decisive importance for the durability of the pressure hose. An area in the range of 0.25 mm$^2$ and 2.25 mm$^2$ as indicated, which corresponds to a relative distance of two adjacent multifilament yarns of 0.5 mm in the lower tolerance range and 1.5 mm in the upper tolerance range has proven to be optimum at a diameter of the inner tubing of between 4 mm and 6 mm, approximately, so that the pressure hose fulfills the requisite test conditions.

A mesh area of 1 mm$^2$ has proven to be particularly advantageous, because this area, while being suitable for providing a sufficient degree of bonding of the outer tubing to the inner tubing, yet enables the outer tubing to be detached from the inner tubing with relative ease, which is a requirement under VDE standards (VDE=German Electrical Engineers Association). These standards require that a food-safe pressure hose be separable into its individual components, that is, inner tubing, outer tubing and the woven fabric, without destroying the inner tubing in the process. The hose of the present invention is equally in conformity with this regulation.

Although the mesh areas establishing the sole connection between the outer tubing and the inner tubing are relatively small, they are nevertheless sufficient to obviate the possibility of displacement of the woven fabric made of polyester yarn relative to the outer surface of the inner tubing with the pressure hose in operation, which would ultimately result in destruction of the pressure hose. On the other hand, the meshes were selected so narrow as to enable the hose to be separated into its individual components particularly when it is disposed of, that is, the outer tubing is separable from the inner tubing, enabling the braiding to be pulled off from the inner tubing.

The hose is capable of withstanding pressure and bending stresses particularly well With a hardness of 70 Shore, the pressure hose affords very good elastic deformability in spite of its high strength.

in the use of silicone for both the inner tubing and the outer tubing, in combination with a braiding made of polyester yarn, a food-safe pressure hose is obtained by means of which hot water under pressure can be delivered without problems. Advantageously, however, the wall thickness of the inner tubing is not less than 0.7 mm, preferably of the order of 1 mm. Also a wall thickness of 0.7 mm is still sufficient to enable the hose to withstand pressure and bending stresses as hot water is passed therethrough. While it will be apparent that an increased wall thickness results in greater strength, it involves the use of more material, increasing the cost of the hose unnecessarily. The loads to which the pressure hose is exposed can be taken by the hose to a satisfactory degree if the wall thickness of the outer tubing is not below 0.2 mm. Particularly good results have been obtained by providing the outer tubing with a wall thickness of 0.5 mm. Obviously, the wall thickness may be further increased if the pressure hose is exposed to the action of chafing as a result of vibrations, for example.

The use of a TREVIRA™ polyester yarn in the braiding enables the pressure hose to withstand the requisite loads without problems. Not only is the Trevira yarn safe when used with food, it is also unaffected by high temperatures caused by fluid under pressure as "hot water".

The meshes on the inner tubing are obtained in a very simple manner, with a high strength and a high pressure resistance of the woven fabric being accomplished. These properties will diminish with the angles of interlacement increasing.

An embodiment of the present invention will be described in more detail in the following with reference to the accompanying drawings.

Figure 2:
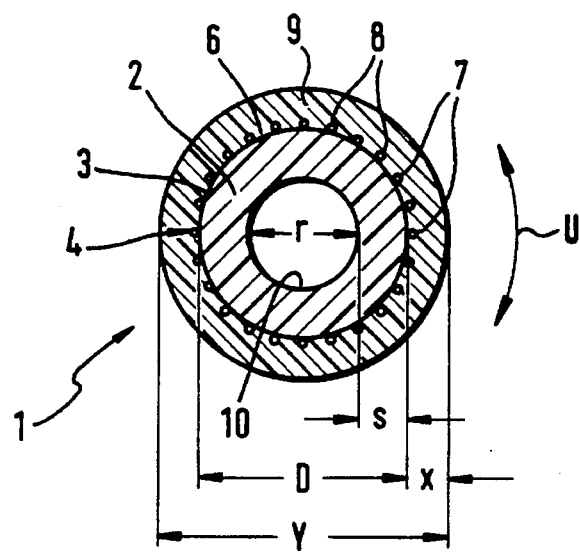

In the drawings,

FIG. 1 is a front view of a length of a pressure hose constructed in accordance with the present invention; and FIG. 2 is a cross-sectional view of the pressure hose taken along the line II—II of FIG. 1.

Referring now to FIGS. 1 and 2 of the drawings, there is shown a length of a hot water resistant pressure hose 1 which, according to FIG. 2, is essentially comprised of an inner tubing 2 extruded from silicone, with a wall thickness s of preferably 1 mm. Provided on the outer surface 3 of the inner tubing 2 is a braiding 4 preferably applied to the outer surface 3 by winding or interlacing with a low amount of tension. The braiding 4 is made of a polyester yarn, preferably a TREVIRA™ polyester yarn 7, 8, which in the embodiment of the present invention is composed of about 48 fine single filaments which, however, are not recognizable in the drawings.

In FIG. 1, the pressure hose 1 of the present invention has twelve yarns 7 wound around the inner tubing 2 in the right-hand direction, and twelve yarns 8 wound around the inner tubing 2 in the left-hand direction, selecting an angle of interlacement a of 45° in relation to the horizontal 11. The right-wound yarns 7 are interlaced in Z-shape, while the left-wound TREVIRA™ polyester yarns 8 are interlaced in S-shape.

As becomes apparent from FIG. 1, the particular type of winding (whether wound or interlaced) produces meshes 6 of approximately equal size because, for one thing, the TREVIRA™ polyester yarns 7, 8 are uniformly spaced on the outer surface 3 in the circumferential direction U (FIG. 2) and, for another thing, the angle of interlacement a is maintained identical for all yarns; according to the present invention, each mesh covers a surface area of between 0.25 mm² and 2.25 mm². The right-wound TREVIRA™ polyester yarns are identified by the reference numeral 7, while the left-wound TREVIRA™ polyester yarns are designated by the reference numeral 8. The relative distance b of two TREVIRA™ polyester yarns 7 and 8 is between 0.5 mm and 1.5 mm, preferably 1 mm.

In FIG. 2, applied to the braiding 4 by extrusion is an outer tubing 9 which is equally made of transparent silicone and is intimately bonded to the inner tubing 2 through the meshes 6. A bore 10 provided in the center of the inner tubing 2 serves to deliver the fluid under pressure as, for example, hot water. The meshes 6 as well as the outside of the braiding 4 are intimately connected with the outer tubing 9 such that the braiding 4 is held captive between the tubings 2, 9. The silicone material flowing into the meshes 6 and filling them thus keeps the individual TREVIRA™ polyester yarns 7, 8 at a distance. Because silicone is caused to flow into the meshes as the outer tubing 9 is applied, the outer tubing 9 and the inner tubing 2 become an intimately connected structure.

As becomes apparent from FIG. 2, the individual TREVIRA™ polyester yarns 7, 8 are circumferentially arranged in an approximately uniform pattern on the outer surface 3 of the inner tubing 2, with a right-wound TREVIRA™ polyester yarn 7 being followed by a left-wound TREVIRA™ polyester yarn 8, etc., depending on the particular winding pattern. The TREVIRA™ polyester yarns 7, 8 are wound on the circumference in an alternating sequence in such fashion that at one time the right-wound TREVIRA™ polyester yarn 7 lies above, that is, on the outside, while the left-wound TREVIRA™ polyester yarn 8 lies below, being in direct contact with the outer surface 3 of the inner tubing 2. This winding cycle of the TREVIRA™ polyester yarns 7, 8 is repeated along the whole length of the pressure hose 1, resulting in a closely woven fabric or braid structure 4. In this embodiment, each TREVIRA™ polyester yarn 7, 8 is made up of 48 fine individual filaments, with the TREVIRA™ polyester yarn carrying the designation dtex 280 F48 polyester yarn. This particular type of yarn has produced optimum results in the pressure hose 1 constructed in accordance with the present invention.

Reference numeral 12 designates the longitudinal direction of the pressure hose. In FIG. 2, the wall thickness s of the inner tubing is 0.7 mm, minimum, while the wall thickness x of the outer tubing 9 is 0.2 mm, minimum, or greater. The outside diameter D of the inner tubing 2 is 6 mm, maximum, preferably 4.7 mm. The outside diameter Y of the outer tubing 9 depends on the actual outside diameter D of the inner tubing. The bore 13 conveying the fluid has a diameter r of the order of preferably 2.7 mm±0.2 mm.

The pressure hose of the present invention is manufactured as follows:

First, the inner tubing 2 is extruded from a silicone compound and then heated to about 180° C. in a heating device to allow it to cure, that is, to harden. Then the braiding 4 comprised of the individual TREVIRA™ polyester yarns 7, 8 is wound on the outer surface 3 of the inner tubing 2 with a low amount of pretension. The outer tubing—equally made of a silicone compound—is then applied to the outer surface of the hose subassembly comprised of the inner tubing 2 and the braiding 4. In a subsequent operation, the outer tubing 9 is also allowed to cure at about 180° C., in which process the outer tubing 9 becomes so intimately bonded to the outer surface 3 of the inner tubing 2 through the meshes 6 that the braiding 4, being completely encapsulated, is fixedly held on the outer surface 3 of the inner tubing 2. For the purpose of recycling a worn pressure hose 1, the hose is again separable into its three components, leaving only the inner tubing 2 after pulling off the outer tubing 9 and removing the braiding 4.

The pressure hose of the present invention is capable of withstanding a test pressure of 36 bar, maximum, at a water temperature of 95° C. The pressure hose 1 is inodorous and tasteless.

We claim:

1. A hot water resistant pressure hose comprising an inner tubing made of an elastomer and having an outer diameter between four millimeters and six millimeters, an outer tubing made of an elastomer;

braid structure disposed between said inner tubing and said outer tubing, said braid structure comprising a first group of multifilament yarns wound around the inner tubing in the right hand direction, a second group of multifilament yarns wound around said inner tubing in the left hand direction, each said group having ten to fifteen yarns, and each said yarn having a weight between 250 and 310 denier; said braid structure forming mesh openings of approximately equal size, each said mesh opening covering an area in the range of 0.25 mm² to 2.25 mm², said mesh openings selected to enable said outer tubing to be separated from said inner tubing and said braiding to be separated from said inner tubing, and positive engagement bond structure between said inner tubing and said outer tubing through said mesh openings.

2. The pressure hose of claim 1 wherein the hardness of the elastomer of said inner tubing is between 40 and 80 Shore.

3. The pressure hose of claim 2 wherein the hardness of the elastomer of said outer tubing is about 70 Shore.

4. The pressure hose of any preceding claim wherein said inner tubing and said outer tubing are made of silicone.

5. The pressure hose of claim 1 wherein the wall thickness of said inner tubing is at least 0.7 mm.

6. The pressure hose of claim 1 wherein the wall thickness of said outer tubing is at least 0.2 mm.

7. The pressure hose of claim 1 wherein said inner tubing has an inner diameter of three millimeters maximum, and said hose withstands an operating pressure of 35 bar at a hot water delivery temperature of 95° C.

8. The pressure hose of claim 1 wherein one half of said multifilament yarn is in said first group, and the other half of said yarn is in said second group, and the center line extending in the longitudinal direction of the inner tubing encloses with each said multifilament yarn an angle of interlacement (a) of between 40° and 50°.

9. The pressure hose of claim 8 wherein said inner tubing has an inner diameter of three millimeters maximum, and said hose withstands an operating pressure of 35 bar at a hot water delivery temperature of 95° C.

10. The pressure hose of claim 9 wherein the wall thickness of said inner tubing is at least 0.7 mm, and the wall thickness of said outer tubing is at least 0.2 mm.

11. The pressure hose of claim 8 wherein the hardness of the elastomer of said inner tubing is between 40 and 80 Shore, and the hardness of the elastomer of said outer tubing is about 70 Shore.

* * * * *

UNITED STATES PATENT AND TRADEMARK OFFICE
CERTIFICATE OF CORRECTION

PATENT NO.   : 5,613,523
DATED        : March 25, 1997
INVENTOR(S)  : Manfred Klawuhn, Ulrich Haubruch, Ralf Skoda It is certified that error appears in the above-identified patent and that said Letters Patent is hereby corrected as shown below:

Col. 2, l. 32, "Trevira" should be --TREVIRA™ polyester--.

Signed and Sealed this

Eleventh Day of May, 1999

Attest:

Q. TODD DICKINSON

*Attesting Officer*                *Acting Commissioner of Patents and Trademarks*